United States Patent
Iino et al.

(10) Patent No.: US 9,994,788 B2
(45) Date of Patent: *Jun. 12, 2018

(54) GREASE, ROLLING BEARING, ROLLING BEARING DEVICE, AND INFORMATION RECORDING AND REPRODUCING APPARATUS

(71) Applicant: SEIKO INSTRUMENTS INC., Chiba-shi, Chiba-ken (JP)

(72) Inventors: Akihiro Iino, Chiba (JP); Yukihiro Nakayama, Chiba (JP); Misato Hanaoka, Chiba (JP); Hisaya Nakamura, Sodegaura (JP); Hiroki Yoda, Sodegaura (JP)

(73) Assignee: SEIKO INSTRUMENTS INC. (JP)

( * ) Notice: Subject to any disclaimer, the term of this patent is extended or adjusted under 35 U.S.C. 154(b) by 119 days.

This patent is subject to a terminal disclaimer.

(21) Appl. No.: 15/002,033

(22) Filed: Jan. 20, 2016

(65) Prior Publication Data

US 2016/0208190 A1    Jul. 21, 2016

(30) Foreign Application Priority Data

Jan. 21, 2015 (JP) .................................. 2015-009485
Dec. 3, 2015 (JP) .................................. 2015-236921

(51) Int. Cl.
  *C10M 107/02* (2006.01)
  *C10M 171/02* (2006.01)
  (Continued)

(52) U.S. Cl.
  CPC ....... *C10M 169/02* (2013.01); *F16C 33/6633* (2013.01); *C10M 2203/1006* (2013.01);
  (Continued)

(58) Field of Classification Search
  CPC ........ C10M 169/02; C10M 2203/1025; C10M 2215/1026; C10M 2205/0285;
  (Continued)

(56) References Cited

U.S. PATENT DOCUMENTS 5,858,932 A * 1/1999 Dasai ................... C10M 161/00
                                                            508/371
6,656,890 B1 * 12/2003 Fish ..................... C10M 169/00
                                                            508/570
(Continued)

FOREIGN PATENT DOCUMENTS

JP    2003239954    8/2003
JP    2013174334    9/2013

OTHER PUBLICATIONS http://orbichem.co.za/group-i-group-ii-and-group-iii-base-oils/ (copyright 2015).*

(Continued)

*Primary Examiner* — Pamela H Weiss
(74) *Attorney, Agent, or Firm* — Adams & Wilks

(57) ABSTRACT

Grease comprises a base oil and a thickener. The base oil contains mineral oil and poly-α-olefin, the proportion of the mineral oil is 10% by mass to 40% by mass in 100% by mass of the base oil, and a kinematic viscosity $v_1$ of the mineral oil at 40° C. is higher than a kinematic viscosity $v_2$ of the poly-α-olefin at 40° C. The base oil comprises a refined mineral oil that is classified as Group III in a base oil category defined by the American Petroleum Institute, and the flash point of the refined mineral oil is 240° C. or higher. A rolling bearing contains the grease, a rolling bearing device includes a shaft supported by the rolling bearing device, and an information recording and reproducing apparatus includes the rolling bearing device.

11 Claims, 7 Drawing Sheets

(51) Int. Cl.
*C10M 169/02* (2006.01)
*F16C 33/66* (2006.01)
F16C 19/06 (2006.01)
F16C 19/54 (2006.01)

(52) U.S. Cl.
CPC .............. *C10M 2203/1025* (2013.01); *C10M 2205/0285* (2013.01); *C10M 2215/1026* (2013.01); *C10N 2220/022* (2013.01); *C10N 2230/02* (2013.01); *C10N 2230/06* (2013.01); *C10N 2240/02* (2013.01); *C10N 2250/10* (2013.01); *F16C 19/06* (2013.01); *F16C 19/54* (2013.01); *F16C 2210/04* (2013.01); *F16C 2370/12* (2013.01)

(58) Field of Classification Search
CPC ........ C10M 2203/1006; F16C 33/6633; F16C 2370/12; F16C 2210/04; F16C 19/06; F16C 19/54; C10N 2230/06; C10N 2250/10; C10N 2220/022; C10N 2230/02; C10N 2240/02
See application file for complete search history.

(56) References Cited

U.S. PATENT DOCUMENTS

| | | | |
|---|---|---|---|
| 7,928,045 B2 | 4/2011 | Dong et al. .................. 508/569 |
| 2003/0158052 A1* | 8/2003 | Akiyama ............ C10M 169/06 | 508/363 |
| 2004/0254080 A1* | 12/2004 | Sivik .................... C10M 145/10 | 508/136 |
| 2006/0211581 A1 | 9/2006 | Bullock, Jr. .................. 508/110 |
| 2007/0000807 A1 | 1/2007 | Wu et al. ........................ 208/18 |
| 2007/0155634 A1* | 7/2007 | Kubota ............... C10M 169/00 | 508/363 |
| 2007/0161522 A1 | 7/2007 | Cholli et al. .................. 508/545 |
| 2009/0003742 A1 | 1/2009 | Nakatani et al. ............. 384/289 |
| 2009/0029881 A1* | 1/2009 | Okamura ............ C10M 169/02 | 508/100 |
| 2009/0247441 A1 | 10/2009 | Baum ........................... 508/552 |
| 2010/0323937 A1 | 12/2010 | Wu et al. ...................... 508/591 |
| 2011/0183875 A1 | 7/2011 | Soddemann et al. ......... 507/225 |
| 2011/0183876 A1* | 7/2011 | Imai .................... C10M 169/06 | 508/100 |
| 2011/0195880 A1* | 8/2011 | Kawamura .......... C10M 169/00 | 508/144 |
| 2012/0051680 A1* | 3/2012 | Ishikawa ............. F16C 33/3887 | 384/462 |
| 2012/0115763 A1* | 5/2012 | Patil ....................... C08G 65/20 | 508/556 |
| 2012/0314985 A1* | 12/2012 | Saita .................... C10M 169/06 | 384/490 |
| 2013/0023705 A1* | 1/2013 | Teshima ............... C10M 111/04 | 585/13 |
| 2013/0170776 A1* | 7/2013 | Nanasawa ............... F16C 33/32 | 384/456 |
| 2013/0170777 A1* | 7/2013 | Ito ........................ C10M 169/00 | 384/462 |

OTHER PUBLICATIONS

U.S. Office Action dated May 25, 2016 issued in U.S. Appl. No. 15/002,046, now U.S. Pat. No. 9,732,798.
U.S. Office Action dated Aug. 29, 2016 issued in U.S. Appl. No. 15/002,046, now U.S. Pat. No. 9,732,798.
U.S. Office Action dated Jul. 21, 2017 issued in U.S Appl. No. 15/247,117.
U.S. Office Action dated Nov. 2, 2017 issued in U.S. Appl. No. 15/247,117.
Edited by Leslie R. Rudnick. Lubricant Additives Chemistry and Applications, CRC Press Taylor & Francis Group, 2009. Second Edition, p. 4-43.
Naugalube 438L Chemtura Corporation, (Feb. 2001), data sheet.
Naugalube 531 Chemtura Corporation, (Aug. 2001), data sheet.
Group I, II and Group III Baseoils table [online] . ORBICHEM, 2015 [retrieved on Feb. 27, 2017] . Retrieved from the Internet: <URL: http://orbichem.co.za/group-i-group-ii-and-group-iii-base-oils>.
Edited by Leslie R. Rudnick, Lubricant Additives Chemistry and Applications, CRC Press Taylor & Francis Group, 2009. Second Edition, p. 4-43.
Naugalube 531 Chemtura Corporation, (Sep. 2001), data sheet.
Akihiro Iino, U.S. Appl. No. 15/002,046, filed Jan. 20, 2016 (U.S. Pat. No. 9,732,798), Office Action dated Aug. 29, 2016.
Akihiro Iino, U.S. Appl. No. 15/002,046, filed Jan. 20, 2016 (U.S. Pat. No. 9,732,798), Office Action dated Dec. 13, 2016.
Akihiro Iino, U.S. Appl. No. 15/247,117, filed Aug. 25, 2016, Office Action dated Jul. 21, 2017.
Akihiro Iino, U.S. Appl. No. 15/247,117, filed Aug. 25, 2016, Office Action dated Nov. 2, 2017.
Akihiro IINO, U.S. Appl. No. 15/247,117, filed Aug. 25, 2016, Office Action dated Mar. 9, 2018.
"Lubricant Additives R T Vanderbilt Company" (Jun. 2009).

\* cited by examiner

GREASE, ROLLING BEARING, ROLLING BEARING DEVICE, AND INFORMATION RECORDING AND REPRODUCING APPARATUS

BACKGROUND OF THE INVENTION

Field of the Invention

The present invention relates to grease, a rolling bearing, a rolling bearing device, and an information recording and reproducing apparatus.

Priority is claimed on Japanese Patent Application No. 2015-009485, filed on Jan. 21, 2015, and Japanese Patent Application No. 2015-236921, filed on Dec. 3, 2015, the content of which is incorporated herein by reference.

Description of Related Art

As an apparatus that magnetically or optically records various kinds of information on a disc and reproduces the information, an information recording and reproducing apparatus such as a hard disk drive (HDD) is known. Typically, the information recording and reproducing apparatus includes a swing arm in which a head gimbal assembly (magnetic head) that records a signal on a disc and reproduces the signal is provided at a tip end, a rolling bearing device that becomes a rotation supporting point of the swing arm, and an actuator that rotates the swing arm. When the magnetic head is moved to a predetermined position on the disc by rotating the swing arm, the recording and reproduction of the signal can be performed.

Typically, the rolling bearing device includes two rolling bearings in which a plurality of spherical rolling bodies are provided between an inner ring and an outer ring, and a shaft that is inserted to an inner side of the rolling bearing. The outer ring rotates around an axis of the shaft due to rolling of the plurality of rolling bodies, and the swing arm that is connected to the outer ring rotates along with the rotation. The rolling bearing is required to stably operate over a long period of time. Accordingly, grease is used to make movement of the rolling bodies between the inner ring and the outer ring smooth.

The grease for the rolling bearing of the information recording and reproducing apparatus is required to lower the torque on the rolling bearing, to obtain excellent torque smoothness (a property in which the torque is constant in a rotation direction of the rolling bearings), and to enhance durability of the rolling bearing. In addition, since outgas from the grease collects in a gap between the magnetic head and the disc, a problem relating to reading and writing occurs in the information recording and reproducing apparatus. Accordingly, it is important that the amount of outgas from the grease for the rolling bearing is small.

As the grease for the rolling bearing of the information recording and reproducing apparatus, for example, there is known grease that contains a base oil containing a mineral oil and poly-α-olefin (hereinafter, referred to as "PAO"), a thickener (a urea compound and the like), and an extreme pressure agent (an organic phosphorous compound and the like) (refer to Patent Document 1). In this grease, the amount of outgas is relatively small, and the grease causes there to be a low torque on the rolling bearing and the rolling bearing to have excellent torque smoothness and durability. However, recently, along with an increase in density of HDDs or an increase in a demand for server use, a distance between the disc and the magnetic head has reached a nano-order. Accordingly, there is a demand for an additional decrease in the amount of outgas and an additional improvement in durability.

As grease capable of reducing the amount of outgas, there is suggested grease for a rolling bearing in which only PAO is used as the base oil instead of using a mineral oil in which the amount of outgas is larger in comparison to PAO (refer to Patent Document 2). However, in the grease, the amount of outgas is small, but it is difficult to obtains a rolling bearing having sufficient durability.

DOCUMENTS OF RELATED ART

Patent Document

[Patent Document 1] Japanese Unexamined Patent Application, First Publication No. 2003-239954
[Patent Document 2] Japanese Unexamined Patent Application, First Publication No. 2013-174334

SUMMARY OF THE INVENTION

An object of the invention is to provide grease in which the amount of outgas is sufficiently reduced, and which is capable of securing excellent durability in a device to which the grease is applied, a rolling bearing using the grease, a rolling bearing device, and an information recording and reproducing apparatus.

According an aspect of the invention, there is provided grease containing a base oil, and a thickener, wherein the base oil contains a mineral oil and PAO, a proportion of the mineral oil is 10% by mass to 40% by mass in 100% by mass of the base oil, and a kinematic viscosity $v_1$ of the mineral oil at 40° C. is higher than a kinematic viscosity $v_2$ of the PAO at 40° C.

In the grease of the aspect of the invention, a proportion of the PAO in the base oil may be greater than the proportion of the mineral oil.

In addition, a ratio $v_1/v_2$ of the kinematic viscosity $v_1$ to the kinematic viscosity $v_2$ may be 1.3 or greater.

The kinematic viscosity $v_1$ may be 40 mm$^2$/s or greater.
The kinematic viscosity $v_2$ may be 20 mm$^2$/s or greater.
A kinematic viscosity $v$ of the base oil at 40° C. may be 25 mm$^2$/s to 45 mm$^2$/s.

In the grease of the aspect of the invention, the base oil may contain a refined mineral oil that is classified as Group III in a base oil category defined by the American Petroleum Institute (API), and the flash point of the refined mineral oil may be 240° C. or higher, and more preferably 250° C.

The poly-α-olefin may contain a mixture of trimers to pentamers of α-olefin having 8 to 12 carbon atoms.

The thickener may be a urea compound.

According to another aspect of the invention, there is provided a rolling bearing including the grease of the aspect of the invention.

According to still another aspect of the invention, there is provided a rolling bearing device including a shaft and the rolling bearing of the aspect of the invention.

According to still another aspect of the invention, there is provided an information recording and reproducing apparatus including the rolling bearing device of the aspect of the invention.

In the grease of the invention, the amount of outgas is sufficiently reduced. Accordingly, the grease can secure excellent durability in a device to which the grease is applied.

In addition, since the amount of outgas from the grease is sufficiently reduced, the rolling bearing, the rolling bearing device, and the information recording and reproducing apparatus of the invention have excellent durability.

DETAILED DESCRIPTION OF THE INVENTION

Grease

Figure 1:
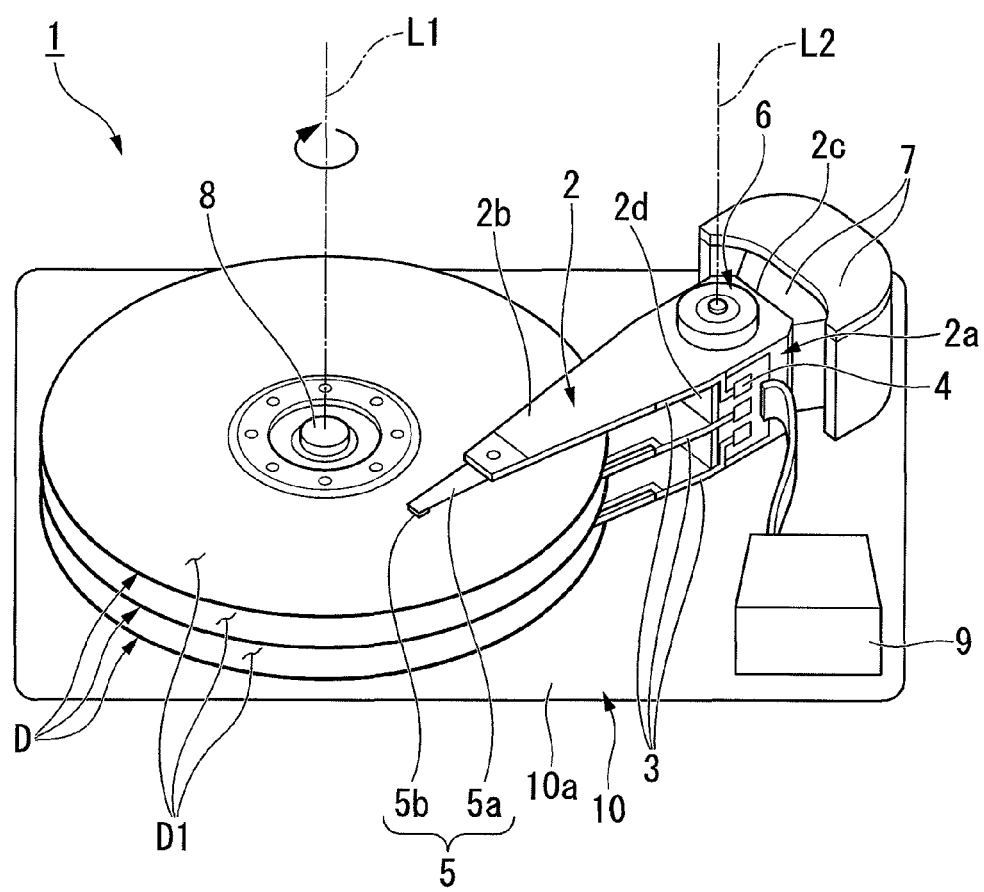
FIG. 1 is a perspective view illustrating an example of an information recording and reproducing apparatus of the invention.

Grease of the invention contains a base oil and a thickener.

Base Oil

The base oil contains a mineral oil and PAO.

As the mineral oil, a mineral oil that is known and is used as the base oil can be used, and examples thereof include a naphthenic mineral oil, a paraffinic mineral oil, a hydrogenated mineral oil, a solvent-refined mineral oil, a highly refined mineral oil, and the like.

As the mineral oil, one kind thereof may be used alone, or two or more kinds thereof may be used in combination. For example, a mixed mineral oil, which is obtained by mixing a plurality of mineral oils, which have kinematic viscosities different from each other, for adjustment to a target kinematic viscosity (average kinematic viscosity), may be used.

As the mineral oil, a refined mineral oil, which is classified as Group III (Gr III) in a base oil category defined by the American petroleum Institute (API), is preferable when considering that grease, in which the amount of outgas is relatively small, heat resistance is excellent, and low-temperature characteristics are also excellent, is obtained. Examples of the refined mineral oil include paraffinic mineral oil that is obtained by subjecting a lubricating oil distillate, which is obtained through atmospheric distillation of crude oil, to high hydrogenation refining, and the like. In the refined mineral oil classified as Group III, it is preferable that the flash point is 240° C. or higher, and more preferably 250° C. or higher. The refined mineral oil has a high degree of refinement and can further reduce the amount of outgas. From this reason, it is assumed that a low-molecular-weight component, which becomes a cause for outgas, is reduced.

As the PAO, PAO that is known and is used as the base oil can be used without limitation, and examples thereof include trimers to pentamers of α-olefin (1-octene, 1-nonene, 1-decene, 1-dodecene, 1-tridecene, 1-tetradecene, 1-pentadecene, 1-hexadecene, 1-heptadecene, 1-octadecene, 1-nonadecene, 1-eicosene, 1-docosene, and the like), and the like. Among these, as the PAO, it is preferable that one kind of trimers to pentamers of α-olefin having 8 to 12 carbon atoms is used alone or in combination of two or more kinds thereof from the viewpoints that the amount of outgas and the evaporation loss are reduced, oxidative degradation resistance characteristics are excellent, and an appropriate viscosity is obtained.

As the PAO, one kind thereof may be used alone, or two or more kinds thereof may be used in combination. For example, mixed PAO, which is obtained by mixing a plurality of kinds of PAO, which have kinematic viscosities different from each other, for adjustment to a target kinematic viscosity (average kinematic viscosity), may be used. Particularly, it is preferable to use a mixture of trimers to pentamers of α-olefin having 8 to 12 carbon atoms when considering that the amount of outgas and a long-term evaporation loss are small, and the oxidative degradation resistance characteristics are excellent.

In addition to the mineral oil and the PAO, the base oil may contain other oil components other than the mineral oil and the PAO.

Examples of the other oil components include a synthetic oil such as an ester oil.

As the other oil components, one kind thereof may be used alone, or two or more kinds thereof may be used in combination.

Kinematic Viscosity

In the grease of the invention, a kinematic viscosity $v_1$ of the mineral oil at 40° C. is set to be higher than a kinematic viscosity $v_2$ of the PAO at 40° C. When the kinematic viscosity $v_1$ of the mineral oil is higher than the kinematic viscosity $v_2$ of the PAO, the heat resistance of the mineral oil becomes excellent. As a result, the amount of outgas from the mineral oil decreases, and as a result, the amount of outgas from the base oil is sufficiently reduced. In addition, the PAO having the kinematic viscosity $v_2$ lower than the kinematic viscosity $v_1$ of the mineral oil is used in combination. Accordingly, the kinematic viscosity $v$ of the base oil is sufficiently lowered. According to this, the grease is sufficiently supplied to a portion such as a portion of the rolling bearing in which the rolling bodies are rolled and the grease is necessary. Accordingly, it is possible to sufficiently obtain a lubricating effect due to the grease.

In addition, the kinematic viscosity of the oil in the invention represents a value that is measured at 40° C. in conformity to JIS K 2283.

In addition, in a case where a plurality of the same kind of base oils, which have kinematic viscosities different from each other, are mixed, the kinematic viscosity of the resultant mixture is regarded as a kinematic viscosity of the base oil.

It is preferable that a ratio $v_1/v_2$ of the kinematic viscosity $v_1$ of the mineral oil to the kinematic viscosity $v_2$ of the PAO is 1.3 or greater when considering that it is easy to reduce the amount of outgas, and more preferably 1.5 or greater. In addition, it is preferable that the ratio $v_1/v_2$ is 4 or less in consideration of low torque on the rolling bearing, and more preferably 2 or less.

It is preferable that the kinematic viscosity $v_1$ of the mineral oil is 40 mm$^2$/s or greater when considering that it is easy to reduce the amount of outgas, and more preferably 45 mm$^2$/s or greater. In addition, it is preferable that the kinematic viscosity $v_1$ of the mineral oil is 80 mm$^2$/s or less when considering that it is easy to supply the grease or the base oil to a surface such as the rolling surface of the rolling bearing in which the grease is necessary, and more preferably 60 mm²/s or less.

It is preferable that the kinematic viscosity $v_2$ of the PAO is 20 mm²/s or greater when considering that it is easy to reduce the amount of outgas, and more preferably 30 mm²/s or greater. In addition, it is preferable that the kinematic viscosity $v_2$ of the PAO is 60 mm²/s or less when considering that it is easy to supply the grease or the base oil to a portion such as the rolling surface of the rolling bearing in which the grease is necessary, and more preferably 40 mm²/s or less.

It is preferable that the kinematic viscosity $v$ of the base oil at 40° C. is 25 mm²/s to 45 mm²/s, and more preferably 30 mm²/s to 40 mm²/s. When the kinematic viscosity $v$ of the base oil is equal to or greater than the lower limit, it is easy to reduce the amount of outgas. When the kinematic viscosity $v$ of the base oil is equal to or less than the upper limit, it is easy to supply the grease or the base oil to a portion such as the rolling surface of the rolling bearing in which the grease is necessary. In addition, it is possible to perform an operation with low torque even in a use in which a stable operation at a low temperature is demanded (for example, an in-vehicle use in which a stable operation is demanded even at a low temperature of −30° C.). Particularly, in a case where the proportion of the mineral oil in 100% by mass of base oil is 30% by mass or less, when the kinematic viscosity $v$ of the base oil at 40° C. is 25 mm²/s or greater, the amount of outgas is further reduced.

Thickener

The thickener has a function of maintaining the grease in a semi-solid shape.

As the thickener, a thickener that is known and is typically used in the grease can be used without limitation. Specific examples of the thickener include a urea compound, lithium soap, and the like. Among these, as the thickener, the urea compound is preferable in consideration of excellent heat resistance, and a diurea compound having two urea bonds in one molecular is more preferable.

Examples of the diurea compound include an aliphatic diurea compound of which the end is an aliphatic group, an alicyclic diurea compound of which the end is an alicyclic group, an aromatic diurea compound of which the end is an aromatic group, and the like.

Specific examples of the diurea compound include a compound that is obtained through a reaction between diisocyanate (phenylene diisocyanate, tolylene diisocyanate, and the like) and monoamine (octylamine, dodecylamine, stearylamine, aniline, p-toluidine, and the like).

Examples of the lithium soap include lithium stearate, lithium 12-hydroxystearate, and the like As the thickener, one kind thereof may be used alone, or two or more kinds thereof may be used in combination.

Other Components

In addition to the base oil and the thickener, the grease of the invention may contain other components other than the base oil and the thickener as necessary.

As the other components, a component that is known and is typically used in the grease can be used, and examples thereof include an extreme pressure agent, an antioxidant, an antirust agent, an oiliness improver, a metal deactivator, and the like.

Examples of the extreme pressure agent include an organic molybdenum compound (molybdenum dithiocarbamate, molybdenum dithiophosphate, and the like), an organic fatty acid compound (oleic acid, naphthenic acid, succinic acid, and the like), an organic phosphorus compound (trioctyl phosphate, triphenyl phosphate, triethyl phosphate, and the like), phosphorus acid ester, and the like. In addition, as the extreme pressure agent, zinc dithiocarbamate, antimony dithiocarbamate, and the like may be used.

As the extreme pressure agent, one kind thereof may be used alone, or two or more kinds thereof may be used in combination.

Examples of the antioxidant include phenol-based antioxidant (2,6-di-t-butyl-4-methylphenol, and the like), an amine-based antioxidant (p,p'-dioctyldiphenylamine, and the like), and the like. As the antioxidant, one kind thereof may be used alone, or two or more kinds thereof may be used in combination. In a case where the grease of the invention contains the antioxidant, it is preferable to use the phenol-based antioxidant and the amine-based antioxidant in combination. In addition, in this case, it is preferable that the amount of the amine-based antioxidant contained in the grease is greater than the amount of the phenol-based antioxidant contained in the grease.

Examples of the antirust agent include an alkali metal salt or an alkaline-earth metal salt of an organic sulfonic acid (calcium sulfonate, magnesium sulfonate, barium sulfonate, and the like), partial ester of polyhydric alcohol (sorbitan monooleate, and the like), and the like.

As the antirust agent, one kind thereof may be used alone, or two or more kinds thereof may be used in combination.

Ratio of Each Component

It is preferable that a proportion of the base oil in 100% by mass of grease of the invention is 75% by mass to 93% by mass, and more preferably 80% by mass to 90% by mass. When the proportion of the base oil is equal to or greater than the lower limit, it is easy to supply the grease or the base oil to a surface such as the rolling surface of the rolling bearing in which the grease is necessary. When the proportion of the base oil is equal to or less than the upper limit, the grease has a semi-solid shape, and leakage is less likely to occur. Accordingly, scattering is less likely to occur.

The proportion of the mineral oil in 100% by mass of base oil is 10% by mass to 40% by mass, and preferably 20% by mass to 30% by mass. When the proportion of the mineral oil is equal to or greater than the lower limit, grease, which is well-balanced between excellent durability and torque smoothness, is obtained. When the proportion of the mineral oil is equal to or less than the upper limit, grease, in which the amount of outgas is sufficiently reduced, is obtained.

It is preferable that a proportion of the PAO in 100% by mass of base oil is 50% by mass to 90% by mass, and more preferably 60% by mass to 80% by mass. When the proportion of the PAO is equal to or greater than the lower limit, it is easy to obtain grease in which the amount of outgas is sufficiently reduced. When the proportion of the PAO is equal to or less than the upper limit, grease, which is well-balanced between the excellent durability and the torque smoothness, is obtained.

It is preferable that a proportion of the sum of the mineral oil and the PAO in 100% by mass of base oil is 70% by mass or greater, more preferably 80% by mass or greater, and still more preferably 90% by mass or greater. When the proportion of the sum of the mineral oil and the PAO is equal to or greater than the lower limit, it is easy to obtain low-torque grease. The upper limit of the proportion of the sum of the mineral oil and the PAO is 100% by mass.

In the grease of the invention, it is preferable that the proportion of the mineral oil in the base oil is greater than the proportion of the PAO when considering that the reduction of the amount of outgas and the excellent durability are likely to be compatible with each other.

It is preferable that a mass ratio (PAO/mineral oil) of the PAO to the mineral oil in the base oil is 1.25 to 9, and more preferably 1.5 to 4. When the mass ratio is equal to or greater than the lower limit, it is easy to sufficiently reduce the amount of outgas. When the mass ratio is equal to or less than the upper limit, it is easy to obtain the excellent durability and torque smoothness.

It is preferable that a proportion of the thickener in 100% by mass of grease of the invention is 7% by mass to 20% by mass, and more preferably 10% by mass to 15% by mass. When the proportion of the thickener is equal to or greater than the lower limit, the grease has a semi-solid shape, and leakage is less likely to occur. Accordingly, scattering is less likely to occur. When the proportion of the thickener is equal to or less than the upper limit, it is easy to supply the grease or the base oil to a surface such as the rolling surface of the rolling bearing in which the grease is necessary.

It is preferable that a proportion of the extreme pressure agent in 100% by mass of grease of the invention is 0.2% by mass to 4% by mass, and more preferably 0.5% by mass to 2% by mass.

It is preferable that a proportion of the antioxidant in 100% by mass of grease of the invention is 0.05% by mass to 4% by mass, and more preferably 0.2% by mass to 2% by mass.

It is preferable that a proportion of the antirust agent in 100% by mass of grease of the invention is 0.2% by mass to 4% by mass, and more preferably 0.5% by mass to 2% by mass.

Use

With regard to the use of the grease of the invention, the grease is particularly useful as grease that is used in a rolling bearing in an information recording and reproducing apparatus, and an apparatus of manufacturing an electronic apparatus. Examples of the apparatus of manufacturing the electronic apparatus include an apparatus of manufacturing a semiconductor, an apparatus of manufacturing a liquid crystal, an apparatus of manufacturing a printed substrate, and the like. In addition, the grease of the invention can be used as grease that is sealed in a linear guide, and a ball screw.

Operation Mechanism

The above-described grease of the invention contains the mineral oil having the kinematic viscosity $v_1$ higher than the kinematic viscosity $v_2$ of the PAO in a specific proportion in addition to the PAO. Accordingly, it is possible to sufficiently reduce the amount of outgas, and it is possible to secure the excellent durability in a device such as the rolling bearing in which grease is necessary. A main cause for the effects obtained is considered as follows.

For example, in the rolling bearing of the information recording and reproducing apparatus, operation conditions such as a swing speed of a swing arm and a rotation range are complex and extensive. Similar to Patent Document 2, in the grease that only uses PAO, in which a molecular weight distribution is narrow, as the base oil, it is difficult to cope with various operation conditions of the rolling bearing. Therefore, movement of the swing arm is not sufficiently smooth, and it is difficult to secure the excellent durability.

In contrast, in the grease of the invention, since the mineral oil, in which the molecular weight distribution is wider in comparison to PAO, is used in combination with the PAO, it is possible to cope with the various operation conditions of the rolling bearing. For example, even in a case where a movement speed of the swing arm is slow, an oil film having a sufficient thickness is formed due to an effect of a component having a large molecular weight and high viscosity in the mineral oil. Accordingly, a sufficient lubricating effect is exhibited. In addition, even in a case where the movement speed of the swing arm is fast, or even in a case where the swing arm moves in a minute range, the grease is sufficiently supplied to a portion at which the rolling bodies roll due to an effect of the component having a low molecular weight and low viscosity in the mineral oil. As described above, it is possible to cope with the extensive operation conditions of the rolling bearing. As a result, it is possible to secure the excellent durability.

Furthermore, in the grease of the invention, the kinematic viscosity $v_1$ of the mineral oil is higher than the kinematic viscosity $v_2$ of the PAO. Accordingly, the heat resistance is excellent, and outgas is less likely to occur in comparison to the mineral oil having a lower kinematic viscosity. In addition, in the grease of the invention, the proportion of the mineral oil in the base oil is controlled in a specific range. Accordingly, the amount of outgas is sufficiently reduced. In addition, the kinematic viscosity $v$ of the base oil can be sufficiently lowered as a whole due to the PAO having the kinematic viscosity $v_2$ lower than the kinematic viscosity of the mineral oil. Accordingly, it is possible to suppress torque on the rolling bearing and the like, and the grease is sufficiently supplied to a surface such as the rolling surface of the rolling bodies in the rolling bearing in which the grease is necessary. As a result, it is possible to make an effect of reducing outgas and an effect of improving the durability be compatible with each other.

In addition, since the PAO has no polarity, affinity with the thickener or an additive which has a polarity is low. Therefore, when using only the PAO as the base oil, it is difficult to uniformly disperse the thickener or the additive. As a result, it is difficult to sufficiently obtain effects thereof. However, in the grease of the invention, the mineral oil having a polarity is used in combination with the PAO. Accordingly, affinity between the base oil and the thickener or the additive becomes satisfactory. According to this, a deviation in the size of the thickener that is synthesized in the base oil is suppressed, the size thereof can be miniaturized, and dispersibility of the thickener is excellent. As a result, the torque smoothness is excellent. In addition, the effect of the additive is sufficiently exhibited.

Information Recording and Reproducing Apparatus

The rolling bearing, the rolling bearing device, and the information recording and reproducing apparatus of the invention can employ other aspects which are known in addition to the grease of the invention. Hereinafter, description will be given with reference to an example of the rolling bearing, the rolling bearing device, and the information recording and reproducing apparatus of the invention.

An information recording and reproducing apparatus 1 of this embodiment is an apparatus that performs writing with respect to a disc (magnetic recording medium) D in a vertical recording type, and includes the disc D, a swing arm 2, an optical waveguide 3, a laser light source 4, a head gimbal assembly (HGA) 5, a rolling bearing device 6, an actuator 7, a spindle motor (rotation drive unit) 8, a control unit 9, and a housing 10 as illustrated in FIG. 1.

The housing 10 accommodates respective constituent portions in the information recording and reproducing apparatus 1.

The housing 10 includes the bottom 10a having a rectangular shape in a plan view, a peripheral wall portion (not illustrated) that erects from a peripheral edge of the bottom 10a, and a cover body (not illustrated) that is detachably fixed to an upper portion of the peripheral wall portion and covers an opening. The housing 10 is configured to accommodate respective constituent components on an inner side of the peripheral wall portion on the bottom 10a. In FIG. 1, the peripheral wall portion and the cover body are omitted for convenience.

A material of the housing 10 is not particularly limited, and examples thereof include a metal material such as aluminum.

The spindle motor 8 is attached to approximately the center of the bottom 10a of the housing 10. In addition, the spindle motor 8 is configured to be inserted into a central hole that is formed at the center of the disc D, and three sheets of the disc D are mounted in a detachable manner. The spindle motor 8 is configured to rotate each of the discs D around a rotation axial line L1 in a constant direction.

The actuator 7 is mounted to be positioned on an outer side of the disc D at one corner portion of the bottom 10a of the housing 10. The swing arm 2, which extends toward the disc D, is connected to the actuator 7. The rolling bearing device 6 is provided to a portion on a base end side of the swing arm 2. The swing arm 2 is configured to rotate around a rotation axial line L2 of the rolling bearing device 6 in a horizontal plane by driving of the actuator 7.

The swing arm 2 includes a base portion 2a that is connected to the actuator 7, and an arm portion 2b that extends from the base portion 2a toward the disc D. For example, the swing arm 2 can be obtained by integrally forming the base portion 2a and the arm portion 2b through machining.

The base portion 2a has an approximately rectangular shape, and is rotatably supported to the rolling bearing device 6 so as to surround the rolling bearing device 6.

The arm portion 2b has a plat plate shape, and is configured in a tapered shape that is narrowed as it goes toward a tip end portion from a base end portion. The arm portion 2b is provided to extend from a front surface (surface opposite to a corner portion) 2d of the base portion 2a, which is opposite to a rear surface 2c to which the actuator 7 is attached, in a plane direction (direction in a horizontal plane) of an upper surface of the base portion 2a.

In addition, in the swing arm 2 in this example, three sheets of the arm portions 2b are provided in a height direction (vertical direction) of the base portion 2a in order for the disc D to be interposed between the arm portions 2b, respectively. That is, each of the arm portions 2b and the disc D are arranged to be alternately positioned in the height direction, and the arm portion 2b is configured to move in a direction parallel to a disc surface (surface of the disc D) D1 by driving of the actuator 7.

The head gimbal assembly 5 is provided to the tip end of the arm portion 2b of the swing arm 2. The laser light source 4 is provided to a lateral surface portion of the base portion 2a of the swing arm 2. The optical waveguide 3, which connects the laser light source 4 and the head gimbal assembly 5, is provided to the base portion 2a and the arm portion 2b of the swing arm 2. According to this, it is possible to supply light from the laser light source 4 to the head gimbal assembly 5 through the optical waveguide 3.

The head gimbal assembly 5 includes a suspension 5a, and a slider 5b that is attached to a tip end of the suspension 5a.

The slider 5b includes a near-field light generating element. When light is guided to the slider 5b from the laser light source 4, near-field light is generated from the near-field generating element. It is possible to record or reproduce various kinds of information on or from the disc D by using the near-field light.

For example, the near-field light generating element is constituted by an optical minute opening, a protrusion that is formed in a nanometer size, and the like.

The head gimbal assembly 5 moves in a direction parallel to the disc surface D1 in combination with the arm portion 2b of the swing arm 2 by driving of the actuator 7. In addition, when the rotation of the disc D is stopped, the swing arm 2 and the head gimbal assembly 5 is configured to retreat from the disc D by driving of the actuator 7.

The control unit 9 is connected to the laser light source 4. The control unit 9 is configured to control a luminous flux of light that is supplied to the slider 5b of the head gimbal assembly 5 by a current that is modulated in accordance with information.

Rolling Bearing Device

Figure 2:
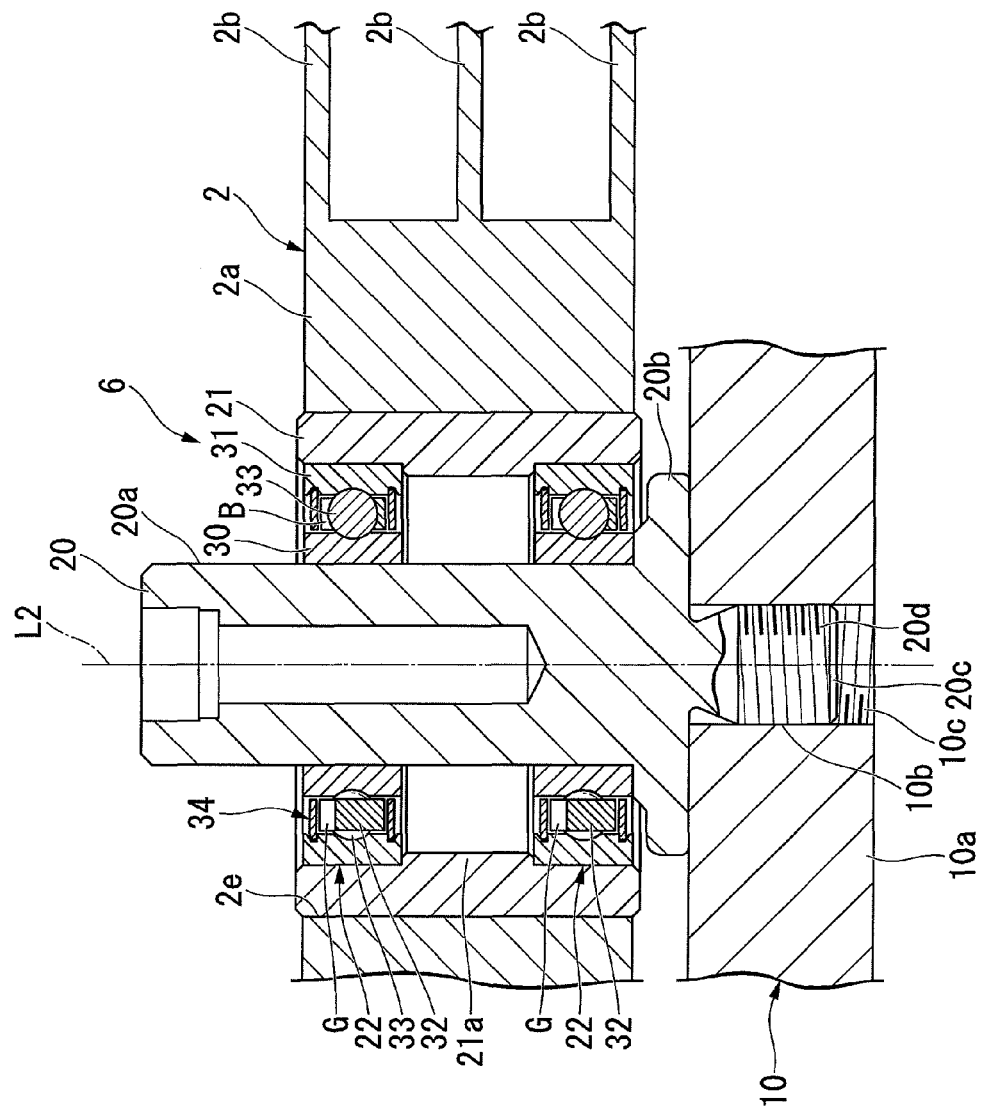
FIG. 2 is a longitudinal cross-sectional view illustrating the periphery of a rolling bearing device in the information recording and reproducing apparatus in FIG. 1.
Figure 3:
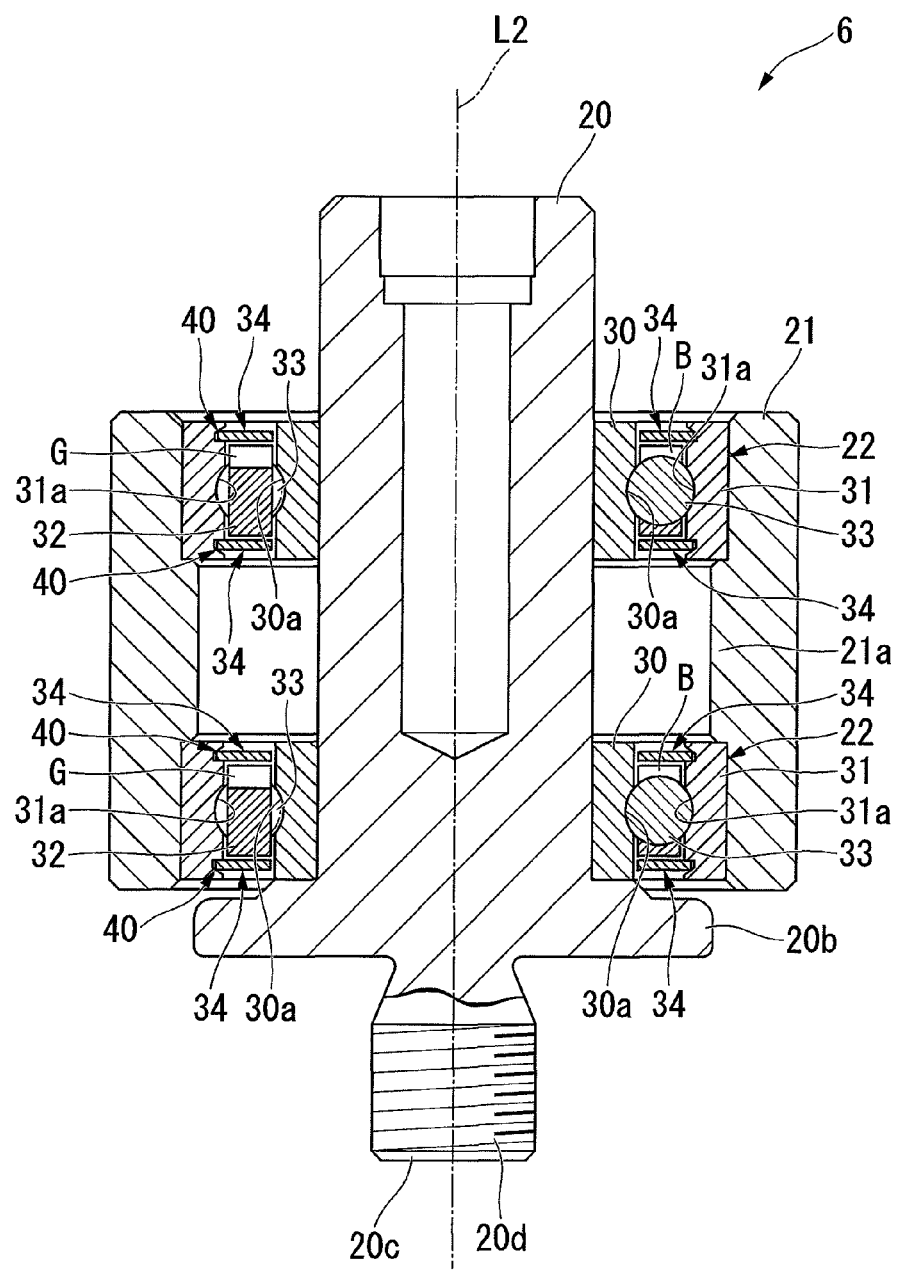
FIG. 3 is a cross-sectional view illustrating the rolling bearing device in FIG. 2.
Figure 4:
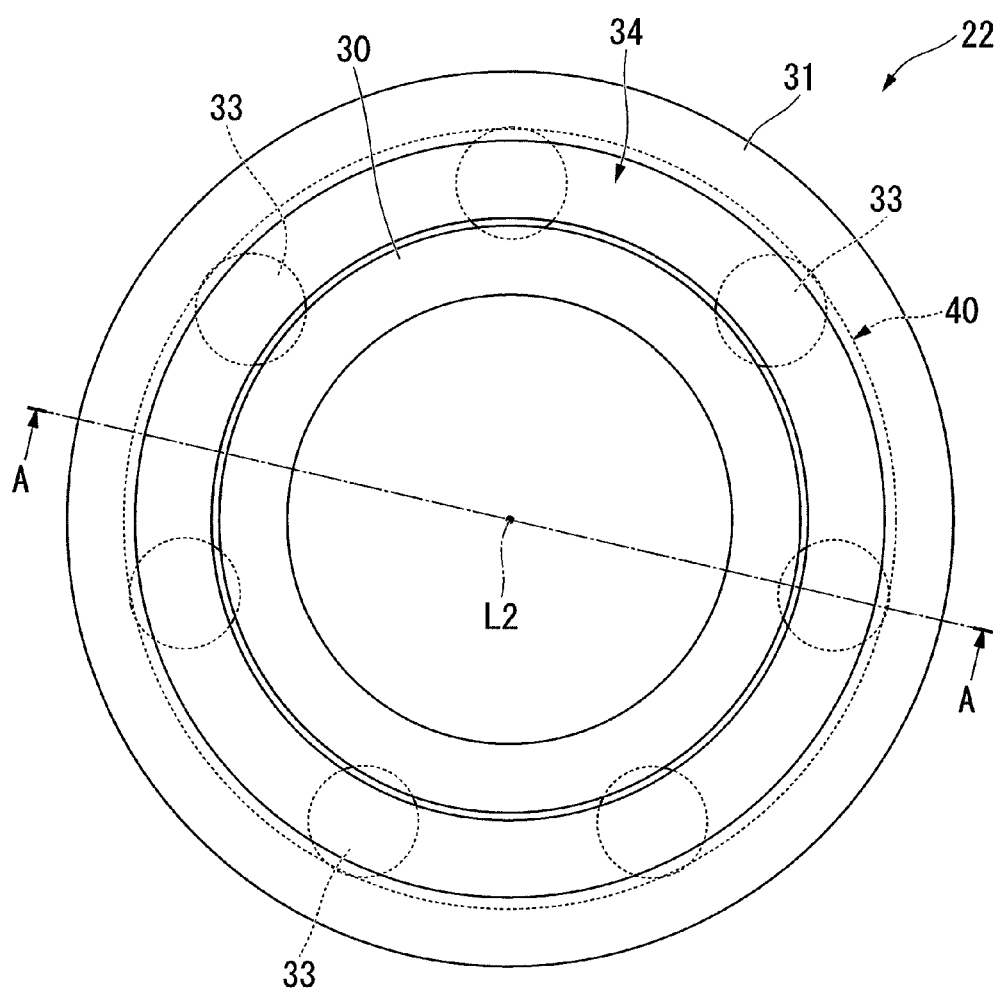
FIG. 4 is a plan view illustrating a rolling bearing in the rolling bearing device in FIG. 3.
Figure 5:
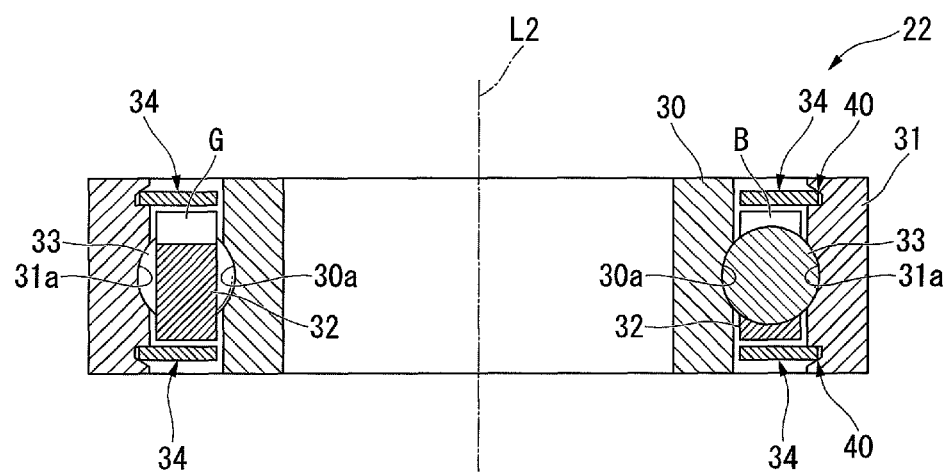
FIG. 5 is a cross-sectional view of the rolling bearing in FIG. 4 which is taken along line A-A.

As illustrated in FIGS. 2 and 3, the rolling bearing device 6 includes a shaft 20, a sleeve 21 that is provided on an outer side of the shaft 20 to be concentric with the shaft 20, and two rolling bearings 22 which are provided between the shaft 20 and the sleeve 21.

The shaft 20 is a rod-shaped member having a columnar shape, and erects from the bottom 10a of the housing 10. A central axis of the shaft 20 becomes the rotation axial line L2 during rotation of the swing arm 2.

At a portion of the shaft 20 on a bottom 10a side of the housing 10, a flange portion 20b having a diameter enlarged from that of a main body portion 20a, and a reduced diameter portion 20c of which a diameter is reduced from that of the main body portion 20a are sequentially provided toward a base end. A male screw 20d is formed on an outer circumferential surface of the reduced diameter portion 20c.

The reduced diameter portion 20c of the shaft 20 is inserted into a hole 10b that is provided in the bottom 10a of the housing 10, and a female screw 10c that is formed on an inner circumferential surface of the hole 10b and the male screw 20d of the reduced diameter portion 20c engage with each other. According to this, the shaft 20 erects from the bottom 10a of the housing 10. At this time, when a lower surface of the flange portion 20b is brought into contact with the bottom 10a of the housing 10, positioning of the shaft 20 in a height direction is made.

The sleeve 21 is a member that is formed in a cylindrical shape. An inner diameter of the sleeve 21 is approximately the same as an outer diameter of the flange portion 20b.

The sleeve 21 is provided to surround the shaft 20 from an outer side in a diameter direction, and an inner circumferential surface thereof is spaced from an outer circumferential surface of the shaft 20 with a predetermined interval. A central axis of the shaft 20 and a central axis of the sleeve 21 are concentric with each other.

In addition, the sleeve 21 may be pressed into a mounting hole 2e that is formed in the base portion 2a of the swing arm 2 directly or through an elastic body such as a corrugated metal ring, or may be bonding-fitted into the mounting hole 2e. According to this, the sleeve 21 and the swing arm 2 are integrally combined with each other.

A spacer portion 21a, which protrudes toward an inner side over the entire circumference in a circumferential direction, is formed at the central portion of the inner circumferential surface of the sleeve 21 in a height direction. Two rolling bearings 22 are provided between the shaft 20 and the sleeve 21 on an upper side and a lower side of the spacer portion 21a, respectively, and a gap between the two rolling bearings 22 is maintained to a predetermined distance.

Rolling Bearing

The two rolling bearings 22 which are provided to the rolling bearing device 6 are the same as each other.

As illustrated in FIGS. 3 to 6, the rolling bearing 22 includes an inner ring 30, an outer ring 31, a retainer 32, a plurality of rolling bodies 33, and two shield plates 34.

The inner ring 30 is a cylindrical member.

An inner diameter of the inner ring 30 is set to dimensions with which the shaft 20 can be inserted into the inner ring 30. In this embodiment, the inner diameter of the inner ring 30 is set to be slightly greater than an outer diameter of the shaft 20. The shaft 20 is inserted to an inner side of the inner ring 30, and the inner ring 30 is fixed to the shaft 20 with an adhesive and the like.

In addition, the inner diameter of the inner ring 30 may be the same as the outer diameter of the shaft 20 or slightly smaller than the outer diameter as long as the inner diameter is in a range capable of being installed to the shaft 20. In this case, the shaft 20 is pressed into and fixed to the inner ring 30.

In the rolling bearing 22, it is possible to employ a so-called inner ring pre-load type in which the inner ring 30 is fixed to the shaft 20 in a state in which a pre-load is applied to the inner ring 30 relatively to the shaft 20 in an axial direction. According to this, it is possible to make the rolling bearing 22 have high rigidity, and it is possible to raise a resonance frequency (resonance point) of the rolling bearing device 6. As a result, the rolling bearing device 6 can cope with a relatively high-speed rotation.

In addition, in the rolling bearing 22, it is also possible to employ a so-called outer ring pre-load type in which the outer ring 31 is fixed to the sleeve 21 in a state in which a pre-load is applied to the outer ring 31 relatively to the shaft 20 in an axial direction.

At an intermediate portion of the outer circumferential surface of the inner ring 30 in the axial direction, an inner ring rolling surface 30a, which is a recessed stripe that guides rolling of the rolling bodies 33, is formed over the entire circumference of the inner ring 30. In the inner ring rolling surface 30a, when cutting the inner ring 30 along a plane passing through the central axis of the inner ring 30, a cross-sectional shape is an arc shape.

Examples of a material of the inner ring 30 include a metal material such as stainless steel. For example, the inner ring 30 can be manufactured by forging, machining, and the like.

The outer ring 31 is member that has a diameter greater than that of the inner ring 30, and has the same cylindrical shape as that of the inner ring 30.

The outer ring 31 is fixed to an inner side of the sleeve 21, and is provided on an outer side of the inner ring 30 in a state of being spaced from the inner ring 30. The inner ring 30 and the outer ring 31 are provided to be concentric with each other so that central axes thereof match the central axis of the shaft 20.

At an intermediate portion of the inner circumferential surface of the outer ring 31 in the axial direction, an outer ring rolling surface 31a, which is a recessed stripe that guides rolling of the rolling bodies 33, is formed over the entire circumference of the outer ring 31 to face the inner ring rolling surface 30a of the inner ring 30. In the outer ring rolling surface 31a, when cutting the outer ring 31 along a plane passing through the central axis of the outer ring 31, a cross-sectional shape is an arc shape.

Examples of a material of the outer ring 31 include a metal material such as stainless steel. For example, the inner ring 30 can be manufactured by forging, machining, and the like.

Figure 6:
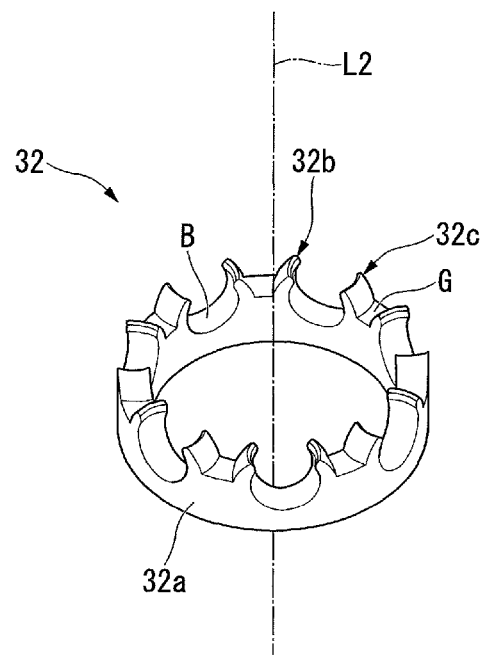
FIG. 6 is a perspective view illustrating a retainer of the rolling bearing in FIG. 5.

As illustrated in FIG. 6, the retainer 32 includes an annular main body portion 32a, and seven pairs of hook portions 32b and 32c which are formed on an upper portion of the main body portion 32a and erect in an arc shape in such a manner that a distance therebetween becomes narrow as it goes toward a tip end. The seven pairs of hook portions 32b and 32c are provided at even intervals in a circumferential direction of the retainer 32. A ball pocket B, which retains each of the rolling bodies 33 in a rolling manner and has an approximately circular shape when viewed from a front side, is formed on an inner side of each pair of the hook portion 32b and the hook portion 32c.

In addition, the number of the pairs of the hook portions, that is, the number of the ball pocket B is not limited to 7, and may be 6 or less, or 8 or greater.

An inner diameter of the retainer 32 is set to be larger than an outer diameter of the inner ring 30, and an outer diameter of the retainer 32 is set to be smaller than an inner diameter of the outer ring 31. In a state in which the retainer 32 is provided between the inner ring 30 and the outer ring 31, the rolling body 33 is retained in each ball pocket B in a rolling manner. As described above, in a state in which the inner ring 30, the outer ring 31, and the retainer 32 do not interfere each other, the rolling body 33 is disposed between the inner ring rolling surface 30a of the inner ring 30 and the outer ring rolling surface 31a of the outer ring 31.

The retainer 32 is configured to rotate around the central axis L2 in a state in which the rolling body 33 is retained in each ball pocket B in a rolling manner.

Although not particularly limited, examples of a material of the retainer 32 include a resin such as a polyamide resin.

A grease pocket G, which has a depth shallower than that of the ball pocket B, is formed between a pair of the hook portions 32b and 32c, and an adjacent pair of the hook portions 32b and 32c on an upper side of the retainer 32. That is, in the retainer 32, the ball pocket B and the grease pocket G are alternately formed in a circumferential direction due to the plurality of pairs of hook portions 32b and 32c.

When the retainer 32 and the rolling body 33 rotate in a state in which the grease of the invention is disposed in the grease pocket G, and the rolling body 33 is disposed in the ball pocket B, the grease bleeds out from the grease pocket G to a space between the inner ring 30, the outer ring 31, and the rolling body 33, and a lubricating effect due to the grease is obtained.

When the grease is used in the rolling bearing 22 by using the grease pocket G, it is possible to reduce the amount of the grease that is used. According to this, it is easy to suppress an increase in torque on the rolling bearing 22 due to an excessive amount of the grease, and it is easy to obtain sufficient cleanness that is demanded for writing and reading to and from the disc D.

In this example, the rolling body 33 has a spherical shape. The rolling body 33 is disposed in the ball pocket B of the retainer 32 between the inner ring rolling surface 30a of the inner ring 30 and the outer ring rolling surface 31a of the outer ring 31, and rolls along the inner ring rolling surface 30a and the outer ring rolling surface 31a. Respective rolling bodies 33 are equally arranged in the circumferential direction due to the retainer 32.

In this example, the number of the rolling bodies 33 is 7. However, the number of the rolling bodies 33 may be determined in accordance with the number of the ball pockets B in the retainer 32, and may be 6 or less or 8 or greater.

Examples of a material of the rolling body 33 include a metal material such as bearing steel.

The shield plates 34 are ring-shaped plate members which cover an upper side and a lower side of an annular space that is formed between the inner ring 30 and the outer ring 31. The shield plates 34 are provided on an upper side and a lower side of the retainer 32 and the plurality of rolling bodies 33, respectively, between the inner ring 30 and the outer ring 31. Each of the shield plates 34 is fixed to the outer ring 31 in a state in which an outer peripheral edge enters a circular groove 40 for engaging which is formed in the outer ring 31.

Operation Mechanism

In the information recording and reproducing apparatus 1, the grease of the invention is disposed in the grease pocket G of the retainer 32 in the rolling bearing 22. When the swing arm 2 rotates by driving of the actuator 7, the grease, which is disposed in the grease pocket G, passes through a lateral surface of the inner ring 30, the outer ring 31, and the retainer 32, and is supplied to a space between the inner ring 30, the outer ring 31, and the rolling bodies 33. According to this, the lubricating effect of the grease is exhibited.

In the information recording and reproducing apparatus 1, since the grease of the invention is used, the amount of outgas is sufficiently reduced. According to this, outgas is less likely to be collected in a gap between the head gimbal assembly and the disc D. As a result, it is possible to stably perform reading and writing. In addition, it is possible to secure excellent durability, and it is possible to maintain a state in which torque smoothness is excellent with low torque over a long period of time.

OTHER EMBODIMENTS

In addition, the rolling bearing, the rolling bearing device, and the information recording and reproducing apparatus of the invention are not limited to the above-described configurations as long as the grease of the invention is used.

For example, the information recording and reproducing apparatus 1 including the rolling bearing 22 and the rolling bearing device 6 uses near-field light, but may be a typical HDD or optical disc D device including a rolling bearing and a rolling bearing device which use the grease of the invention, and the like.

In addition, the rolling bearing device may not include the sleeve. Specifically, it is possible to employ a rolling bearing device that includes a ring-shaped spacer ring, which maintains a gap between the rolling bearings to a predetermined distance, between the two rolling bearings which are disposed to be spaced away from each other in an axial direction on an outer side of the shaft, and does not include the sleeve. In this case, it is possible to employ an aspect in which the outer ring of the rolling bearing is directly pressed into or bonding-fitted into the mounting hole that is formed in the base portion of the swing arm.

In addition, the rolling bodies in the rolling bearing may be cylindrical rollers.

EXAMPLES

Hereinafter, the invention will be described in detail with reference to Examples, but the invention is not limited by the following description.

Kinematic Viscosity

The kinematic viscosity of the mineral oil, the PAO, and the base oil was measured at 40° C. in conformity to JIS K 2283 by using a Cannon-Fenske viscometer.

Measurement of Amount of Outgas

Sample grease (4.5 mg to 5.5 mg) was uniformly applied onto aluminum foil of 15 mm square by using a glass rod, and was set as a measurement sample. The measurement sample was heated at 85° C. for 3 hours in an oven in combination with 5 (100 ng) of standard reagent (hexadecane), and a gas that was generated was adsorbed to a collection tube. Subsequently, the collection tube was mounted on a heating and desorption device (TD-100) and was heated at 320° C., and a gas, which was generated from the collection tube, was transmitted to a gas chromatography mass spectrometer (GC-MS). In the GC-MS, chromatogram data was obtained by a temperature profile in which retention was performed at 40° C. for 2 minutes, a temperature was raised to 280° C. for 20 minutes at a rate of 12° C./minute, and retention was performed at 280° C. for 20 minutes, and then component identification was performed by a library inside the GC-MS. The amount of outgas was calculated in terms of the standard reagent on the basis of a chromatograph peak (corresponding to 100 ng) of the standard reagent (hexadecane).

Durability Test

The rolling bearing device 6 illustrated in FIGS. 3 to 6 was prepared. Then, the grease of each example was disposed in the grease pocket G of the retainer 32, and a continuous operation was performed under the following operation conditions to measure a torque variation width (hashing) as a torque ratio of torque after the continuous operation to initial torque before the continuous operation.

Operation Conditions

Operation frequency: 30 Hz

Operation angle: 10 deg

Operation time: 100 hours

Operation environmental temperature: 80° C.

Grease Bump Test

The rolling bearing device 6 illustrated in FIGS. 3 to 6 was prepared. Then, grease of each example was disposed in the grease pocket G of the retainer 32, and a continuous operation was performed under the following operation conditions to measure torque immediately after the continuous operation. The evaluation was performed in accordance with the following standards.

Operation Conditions

Operation frequency: 15 Hz

Operation angle: 5 deg

Operation time: 50 hours

Operation environmental temperature: Room temperature

Evaluation Standards

O: Torque immediately after the continuous operation hardly varies from the initial torque before the continuous operation.

x: Torque immediately after the continuous operation greatly varies from the initial torque before the continuous operation.

Low Temperature Torque Test

A low temperature torque test was performed at 0° C. and −30° C. in conformity to JIS K 2220 (Low Temperature Torque Test, bearing: 6204) to measure activation torque (initial torque), and rotation torque after torque is stabilized after activation.

Long-Term Evaporation Loss Test 5 g of grease was put into a shale having an outer diameter of 41 mm, an inner diameter of 37 mm, and a height of 8 mm (accommodation height: 5 mm), and was settled in thermostatic baths, which were maintained to 85° C., 100° C., and 130° C., respectively, in a state in which a surface was made to be smoothly flat. Then, the schale was taken out from the respective thermostatic baths for each constant time to measure the mass of the grease. An evaporation loss (% by mass) of the grease was calculated from a variation in the mass for each hour with respect to the mass of the grease before the settlement in the thermostatic baths.

Example 1

A refined mineral oil (classified as Group III in the API base oil category, the kinematic viscosity $v_1$: 47 mm²/s (40° C.), the flash point: 250° C. or higher), and PAO (a mixture of trimers to pentamers of α-olefin having 8 to 12 carbon atoms, kinematic viscosity $v_2$: 30 mm²/s (40° C.)) were mixed with each other in a mass ratio of 3:7 to obtain a base oil (kinematic viscosity $v$: 34 mm²/s (40° C.)).

Then, grease was formed by using the base oil, and an alicyclic diurea compound as the thickener, and then an antioxidant and an antirust agent were added to the grease, and the resultant mixture was mixed. As proportions of respective components in 100% by mass of grease, the base oil was set to 86.0% by mass, the thickener was set to 12.5% by mass, the antioxidant was set to 0.5% by mass, and the antirust agent was set to 1.0% by mass.

Example 2

Grease was formed by using the base oil and the alicyclic diurea compound as the thickener, and the remaining process was performed in the same manner as Example 1 except that an extreme pressure agent was added and mixed in addition to the antioxidant and the antirust agent. As proportions of the respective components in 100% by mass of grease, the base oil was set to 85.0% by mass, the thickener was set to 12.5% by mass, the antioxidant was set to 0.5% by mass, the antirust agent was set to 1.0% by mass, and the extreme pressure agent was set to 1.0% by mass.

Comparative Example 1

A mineral oil (the kinematic viscosity $v_1$: 52 mm²/s (40° C.), the flash point: 220° C. or higher), and PAO (a mixture of trimers to pentamers of α-olefin having 8 to 12 carbon atoms, kinematic viscosity $v_2$: 52 mm²/s (40° C.)) were mixed with each other in a mass ratio of 1:1 to obtain a base oil (kinematic viscosity $v$: 52 mm²/s (40° C.)). Then, grease was formed by using the base oil, and the alicyclic diurea compound as the thickener, and then the antioxidant and the antirust agent were added to the grease, and the resultant mixture was mixed.

Comparative Example 2

Grease was obtained in the same manner as Example 1 except that PAO (a mixture of trimers to pentamers of α-olefin having 8 to 12 carbon atoms, kinematic viscosity $v$: 30 mm²/s (40° C.)) was used as the base oil.

Comparative Example 3

Grease was obtained in the same manner as Example 2 except that PAO (a mixture of trimers to pentamers of α-olefin having 8 to 12 carbon atoms, kinematic viscosity $v$: 30 mm²/s (40° C.)) was used as the base oil.

Reference Example 1

As the grease, commercially available grease α for the rolling bearing of the information recording and reproducing apparatus was prepared. In addition, the grease α contains a urea compound as the thickener.

Figure 7:
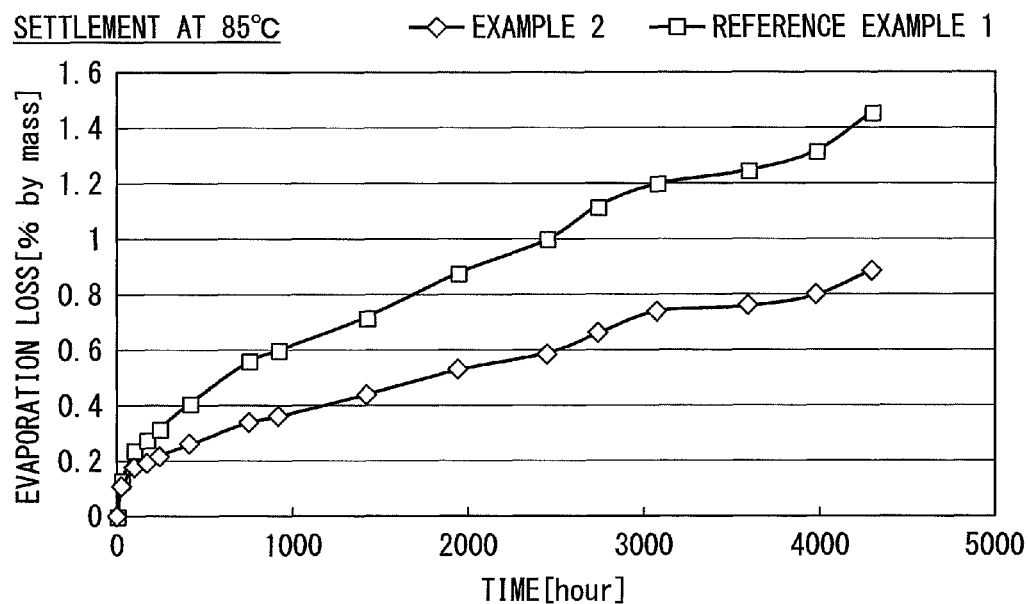
FIG. 7 is a graph illustrating a relationship between a settling time and an evaporation loss when the grease is settled at 85° C.
Figure 8:
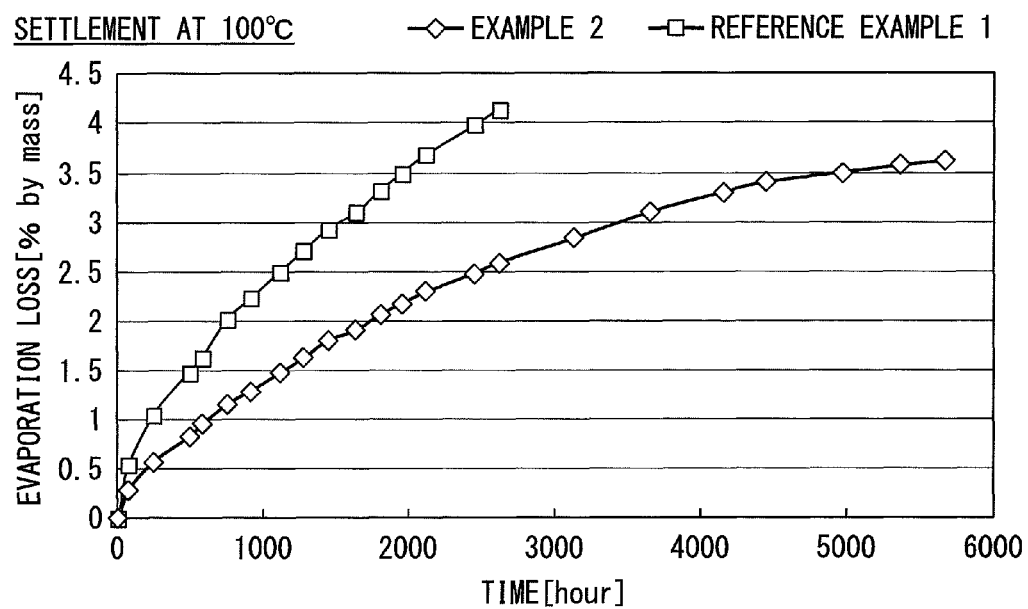
FIG. 8 is a graph illustrating a relationship between the settling time and the evaporation loss when the grease is settled at 100° C.
Figure 9:
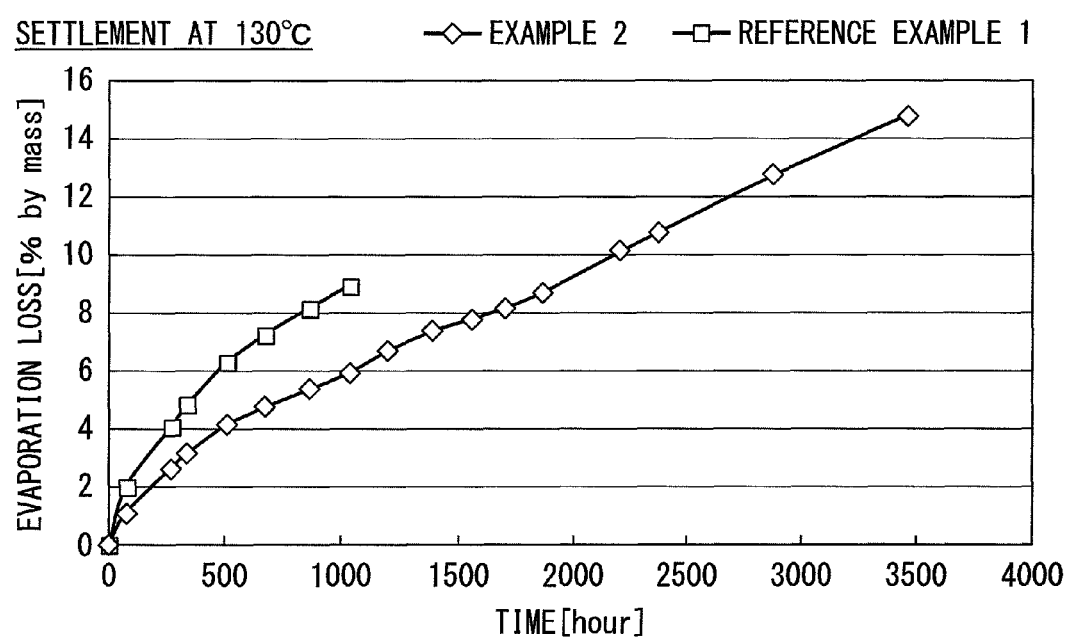
FIG. 9 is a graph illustrating a relationship between the settling time and the evaporation loss when the grease is settled at 130° C.

Results of measurement of the amount of outgas, a durability test, and a grease bump test in respective Examples and Comparative Examples are illustrated in Table 1. In addition, results of a low temperature torque test of the grease in Example 2 and Reference Example 1 are illustrated in Table 2, and results of long-term evaporation loss test are illustrated in FIGS. 7 to 9.

TABLE 1

| | | Example 1 | Example 2 | Comparative Example 1 | Comparative Example 2 | Comparative Example 3 |
|---|---|---|---|---|---|---|
| Base oil | Kinematic viscosity $v_1$ of mineral oil [mm²/s] | 47 | 47 | 52 | — | — |
| | Kinematic viscosity $v_2$ of PAO [mm²/s] | 30 | 30 | 52 | 30 | 30 |
| | $v_1/v_2$ | 1.57 | 1.57 | 1 | — | — |
| | Kinematic viscosity $v$ of base oil [mm²/s] | 34 | 34 | 52 | 30 | 30 |
| Amount of outgas [ng] | Total amount | 866 | 917 | 7622 | 812 | 1444 |
| | Aliphatic hydrocarbon | 284 | 272 | 3817 | 288 | 363 |
| | Aromatic hydrocarbon | 40 | 39 | 187 | 13 | 42 |
| | Amine-based | 5 | 4 | 1213 | 9 | 17 |
| | Phenol-based | 309 | 404 | 128 | 266 | 341 |
| | Alcohol-based | 32 | 20 | 120 | 10 | 29 |
| | Aldehyde-based | 14 | 29 | 0 | 22 | 27 |
| | Ether-based | 0 | 0 | 0 | 0 | 0 |
| | Ketone-based | 10 | 22 | 374 | 21 | 25 |
| | Ester-based | 46 | 34 | 508 | 55 | 50 |
| | Benzotriazole | 79 | 50 | 0 | 82 | 496 |
| | Indistinct component | 49 | 43 | 1275 | 46 | 54 |
| | Durability test (torque variation width) [times] | 1.8 | 1.6 | 5 | 2 | 1.7 |
| | Grease bump test | ◯ | ◯ | X | Δ (6 times) | Δ (2.4 times) | Δ (1.5 times) |

TABLE 2

|  |  | Reference Example 2 | Example 1 |
|---|---|---|---|
| Measurement temperature −30° C. | Activation torque [mN · m] | 220 | 470 |
|  | Rotation torque [mN · m] | 35 | 74 |
| Measurement temperature 0° C. | Activation torque [mN · m] | 55 | 99 |
|  | Rotation torque [mN · m] | 17 | 27 |

As illustrated in Tables 1 and 2, in the grease in Examples 1 and 2 which contained the base oil using the mineral oil having the kinematic viscosity $v_1$ higher than the kinematic viscosity $v_2$ of the PAO in the ratio of the invention, the amount of outgas was small. In addition, in Examples 1 and 2, a variation in torque was small in both the durability test and the grease bump test, and excellent durability was exhibited. In addition, the grease in Example 2 was excellent in low temperature characteristics in comparison to the commercially available grease α of Reference Example 1, and the evaporation loss was also small.

On the other hand, in the grease of Comparative Example 1 in which the proportion of the mineral oil was large, the amount of outgas was large. In addition, in Comparative Example 1, the torque variation width in the durability test was large, and durability thereof was inferior to that of Examples 1 and 2. In addition, in the grease bump test, the torque after the continuous operation increased to approximately 6 times the torque before the continuous operation. The main cause for this is considered as follows. The grease, which is oxidatively degraded, collects to an edge portion in an operation range in the continuous operation to form a bump, or abrasion is extensive at the edge portion of the operation range during the continuous operation.

In addition, in the grease of Comparative Examples 2 and 3 in which the mineral oil was not used, the amount of outgas was small, but durability was inferior.

Experiment Example 1

The above-described measurement of the amount of outgas was performed with respect to the following four components A to D.

Component A: Mixture of trimers to pentamers of α-olefin having 10 carbon atoms (kinematic viscosity $v_2$=30 mm$^2$/s (40° C.). Hereinafter, referred to as PAO (decene)).

Component B: Mixture of trimers to pentamers of α-olefin having 8 to 12 carbon atoms (kinematic viscosity $v_2$=30 mm$^2$/s (40° C.). Hereinafter, referred to as PAO (MIX)).

Component C: Component obtained by adding the antioxidant to the PAO (decene) in such a manner that the amount of the antioxidant contained becomes 0.2% by mass on the basis of the total mass of the PAO (decene) and the antioxidant.

Component D: Component obtained by adding the antioxidant to the PAO (MIX) in such a manner that the amount of the antioxidant contained becomes 0.2% by mass on the basis of the total mass of the PAO (MIX) and the antioxidant.

Results are illustrated in Table 3.

TABLE 3

|  |  | Component A (decene) | Component B (PAO(MIX)) | Component C (decene + antioxidant) | Component D (PAO(MIX) + antioxidant) |
|---|---|---|---|---|---|
| Amount of outgas [ng] | Total amount | 1544 | 351 | 1430 | 257 |
|  | Aliphatic hydrocarbon | 975 | 43 | 894 | 31 |
|  | Aromatic hydrocarbon | 8 | 9 | 5 | 9 |
|  | Amine-based | 0 | 0 | 4 | 0 |
|  | Phenol-based | 89 | 84 | 96 | 64 |
|  | Alcohol-based | 0 | 0 | 2 | 11 |
|  | Aldehyde-based | 5 | 18 | 35 | 12 |
|  | Ether-based | 0 | 0 | 0 | 0 |
|  | Ketone-based | 1 | 0 | 5 | 4 |
|  | Ester-based | 7 | 4 | 74 | 16 |
|  | Benzotriazole | 0 | 0 | 0 | 0 |
|  | Indistinct component | 454 | 191 | 311 | 110 |

As illustrated in Table 3, the amount of outgas in the components B and D, in which the PAO was a mixture of trimers to pentamers of α-olefin having 8 to 12 carbon atoms, was smaller than the amount of outgas in the components A and C in which the PAO was a single component.

Experiment Example 2

An oxidative degradation resistance test was performed with respect to the components A to D. Specifically, 5 g of each component was collected in a beaker (a cylindrical container having outer diameter×height: 30 mm×40 mm), and was settled in a thermostatic bath maintained at 100° C. After the passage of 240 hours, a component in each beaker was measured with FT-IR for every 24 hours to confirm whether or not the oxidative degradation occurred. Time, at which the oxidative degradation was confirmed for the first time, is illustrated in Table 4.

TABLE 4

|  | Oxidation deterioration time |
|---|---|
| Component A (decene) | 288 hours |
| Component B (PAO(MIX)) | 1848 hours |
| Component C (decene + antioxidant) | 1560 hours |
| Component D (PAO(MIX) + antioxidant) | 2064 hours |

As illustrated in Table 4, the oxidative degradation resistance of the components B and D, in which PAO is a mixtures of trimers to pentamers of α-olefin having 8 to 12 carbon atoms, was more excellent in comparison to the components A and C in which the PAO is a single component.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATION OF REFERENCES

1: Information recording and reproducing apparatus
2: Swing arm
3: Optical waveguide
4: Laser light source
5: Head gimbal assembly
6: Rolling bearing device
7: Actuator
8: Spindle motor
9: Control unit
10: Housing
20: Shaft
21: Sleeve
22: Rolling bearing
30: Inner ring
31: Outer ring
32: Retainer
33: Rolling body
34: Shield plate
B: Ball pocket
G: Grease pocket

What is claimed is:

1. Grease comprising:
a base oil; and
a thickener, wherein
the base oil comprises a mineral oil and poly-α-olefin,
a proportion of the mineral oil is 10% by mass to 40% by mass in 100% by mass of the base oil,
a kinematic viscosity $v_1$ of the mineral oil at 40° C. is higher than a kinematic viscosity $v_2$ of the poly-α-olefin at 40° C.,
a proportion of the poly-α-olefin in the base oil is greater than the proportion of the mineral oil, and
the base oil comprises a refined mineral oil that is classified as Group III in a base oil category defined by the American Petroleum Institute, and the flash point of the refined mineral oil is 240° C. or higher.

2. The grease according to claim 1,
wherein a ratio $v_1/v_2$ of the kinematic viscosity $v_1$ to the kinematic viscosity $v_2$ is 1.3 or greater.

3. The grease according to claim 1,
wherein the kinematic viscosity $v_1$ is 40 mm$^2$/s or greater.

4. The grease according to claim 1,
wherein the kinematic viscosity $v_2$ is 20 mm$^2$/s or greater.

5. The grease according to claim 1,
wherein the kinematic viscosity of the base oil at 40° C. is 25 mm$^2$/s to 45 mm$^2$/s.

6. The grease according to claim 1,
wherein the flash point of the refined mineral oil is 250° C. or higher.

7. The grease according to claim 1,
wherein the poly-α-olefin contains a mixture of trimers to pentamers of α-olefin having 8 to 12 carbon atoms.

8. The grease according to claim 1,
wherein the thickener comprises a urea compound.

9. A rolling bearing containing the grease according to claim 1.

10. A rolling bearing device, comprising:
a shaft; and
the rolling bearing according to claim 9 supporting the shaft.

11. An information recording and reproducing apparatus, comprising:
the rolling bearing device according to claim 10.

* * * * *